United States Patent [19]

Ott

[11] Patent Number: 5,209,297
[45] Date of Patent: May 11, 1993

[54] METHOD OF DRILLING THROUGH A HIGH TEMPERATURE FORMATION

[75] Inventor: William K. Ott, Houston, Tex.

[73] Assignee: Well Completion Technology, Houston, Tex.

[21] Appl. No.: 767,003

[22] Filed: Sep. 27, 1991

[51] Int. Cl.$^5$ .................... E21B 21/06; E21B 37/00
[52] U.S. Cl. ............................... 166/300; 166/307; 166/312; 175/65; 175/72; 507/140
[58] Field of Search ............... 175/65, 72; 166/292, 166/300, 307, 312; 507/140

[56] References Cited

U.S. PATENT DOCUMENTS

| | | | |
|---|---|---|---|
| 2,030,777 | 2/1936 | Woods | 175/65 X |
| 2,233,867 | 3/1941 | Howe | 507/140 X |
| 2,455,188 | 11/1948 | Oxford, Jr. | 507/140 |
| 2,790,776 | 4/1957 | Savage et al. | 507/140 X |
| 3,228,469 | 1/1966 | Kern et al. | 507/140 X |
| 3,640,343 | 2/1972 | Darley | 166/292 |
| 3,679,001 | 7/1972 | Hill | 166/292 |
| 3,746,109 | 7/1973 | Darley | 175/72 X |
| 4,120,369 | 10/1978 | Fischer et al. | 175/72 |
| 4,215,001 | 7/1980 | Elphingstone et al. | 166/307 X |
| 4,231,882 | 11/1980 | Elphingstone et al. | 166/307 X |
| 4,422,948 | 12/1983 | Corley et al. | 175/72 X |
| 4,521,136 | 6/1985 | Murphey | 405/263 |
| 4,706,755 | 11/1987 | Roark et al. | 166/295 |
| 4,844,164 | 7/1989 | Shen | 166/291 |

*Primary Examiner*—George A. Suchfield
*Attorney, Agent, or Firm*—Marcus L. Bates

[57] ABSTRACT

An improved drilling fluid for use in a drilling operation. A drilling rig has a drill string for forming a borehole while drilling fluid flows down the drill string to a drill bit and back up the borehole annulus to a mud pit. The improved drilling fluid of this method enables the borehole to be extended through a geothermal formation having a temperature up to 500 degrees F. The drilling fluid has a highly viscous thixotropic fluid added thereto during a drilling operation in order to achieve a mixture having at least ½% polymerized alkali metal silicate that is formed by combining an aqueous acid solution with an aqueous alkali metal silicate solution, whereby a polymerized alkali metal silicate gel is produced followed by shearing of the gel to impart thixotropic properties thereto.

10 Claims, 1 Drawing Sheet

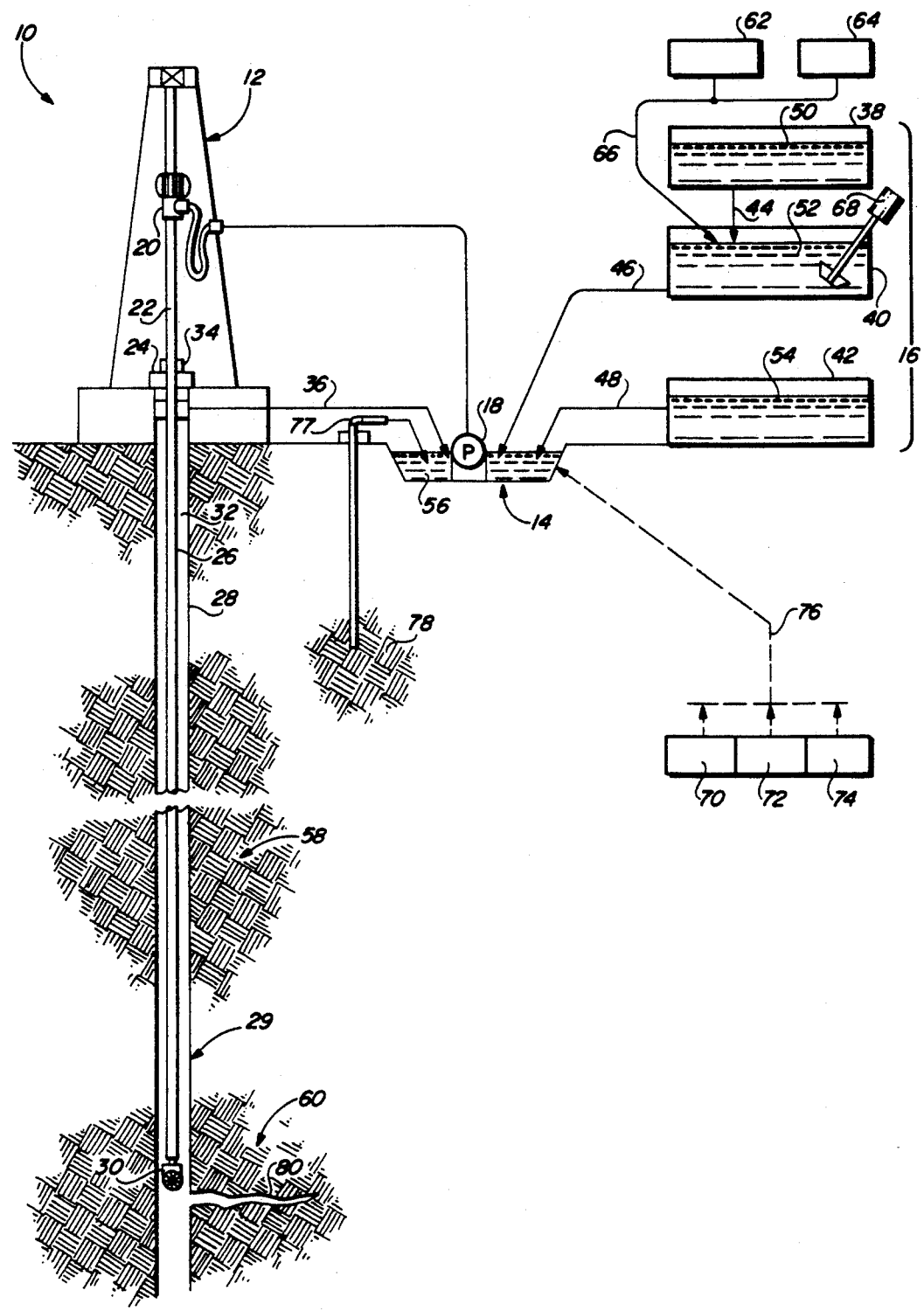

METHOD OF DRILLING THROUGH A HIGH TEMPERATURE FORMATION

BACKGROUND OF THE DISCLOSURE

In the past, downhole well formations have been treated with a highly viscous thixotropic treating fluid in order to introduce the treating fluid into the formation, as set forth, for example, in U.S. Pat. No. 4,215,001 to Elphingstone et al. The highly viscous fluid having thixotropic properties is prepared from an aqueous alkali metal silicate solution. The aqueous alkali metal silicate solution is prepared by mixing about five parts by volume grade 40 sodium silicate solution with about 95 parts by volume water. To this solution is added an aqueous acid solution while agitating the mixture. This lowers the pH of the mixture to a value in the range of 7.5–8.5, whereby the alkali metal silicate polymerizes to form a highly viscous rigid gel. This highly crosslinked rigid gel structure is not soluble in water, but is gelatinous due to water being entrapped in the polymer structure. In order to impart thixotropic properties to the polymerized silicate gel, it is sheared by mixing or agitation, preferably while the polymerization reaction is taking place. The resultant substance exhibits thixotropic properties, that is, a low viscosity in turbulent flow but a high viscosity when at rest or at low shear rates.

The viscosity of the polymerized silicate gel can be increased by the addition of a gelling agent, such as hydroxyethyl cellulose (HEC), carboxymethyl cellulose (CMC), hydroxypropyl guar (HPG), and carboxymethyl hydroxypropyl guar (CMHPG), thereto which hydrates with free water contained in the gel.

The Elphingstone et al U.S. Pat. No. 4,231,882 teaches a highly viscous thixotropic treating fluid for treatment of a subterranean well formation, and is commonly referred to as "fracturing fluids". The treating or fracturing fluid is formed by combining an aqueous acid solution with an aqueous alkali metal silicate solution and a gelling agent whereby a highly viscous polymerized alkali metal silicate gel of low pH is produced, followed by shearing of the gel to impart thixotropic properties thereto.

Reference is made to the Elphingstone et al patents for further background.

Applicant has discovered that a polymerized alkali metal silicate gel is useful as a drilling fluid, and especially as a drilling fluid when drilling through a high temperature strata of the earth, as for example, in geothermal wellbores. A gel system that uses a drilling fluid as described herein is inexpensive and non-damaging to the production formation; it has excellent high temperature stability; and should the gel be lost to a fractured formation, it is easily removed by contact with mixtures of hydrochloric and hydrofluoric acids.

SUMMARY OF THE INVENTION

This invention comprehends the use of a highly viscous thixotropic substance as an improved drilling fluid. The substance is admixed with and thereby forms part of a new drilling fluid having unexpected results. This invention is to an improved method of forming a borehole into a geothermal formation, and into an easily fractured formation.

The invention includes a gel system by which the highly viscous thixotropic substance is made and introduced into the drilling fluid of a drilling rig to provide improvements in drilling fluid and in the method of drilling a borehole.

More specifically, this invention comprises admixing a highly viscous thixotropic gel to a water based drilling fluid used in forming a borehole into a geothermal formation, and which may also extend through an easily fractured formation. The thixotropic gel is formed by combining an aqueous acid solution with an aqueous alkali metal silicate solution admixed to form a polymerized alkali metal silicate gel that is sheared during the mixing or followed by shearing of the gel to impart thixotropic properties thereto.

After initial gelation, various salts can be added to the resultant mixture to inhibit swelling and migration of formation clays that may become lost within the formation. Weighting agents, such as barite, hematite, calcium carbonate, or other similar compounds, are added to adjust the fluid density and thereby control formation pressure. Fluid loss control agents also can be included if deemed desirable.

Various surfactants and polymers can also be added to increase the viscosity of the drilling fluid and to either disburse or thicken the drilling fluid to thereby optimize rheological properties of the drilling fluid and enhance its solids carrying ability.

The drilling fluid of this invention is inexpensive and non-damaging to the formation. Should a productive formation fracture and the drilling fluid be introduced thereinto, it is easily subsequently removed with appropriate acids, such as a mixture of hydrochloric and hydrofluoric acids.

A primary object of the present invention is the provision of a new drilling fluid that includes a highly viscous thixotropic substance admixed therewith.

Another object of the invention is to provide a gel system by which a highly viscous thixotropic substance is made and introduced into a drilling fluid of a drilling rig to provide improvements in drilling fluids and method of drilling boreholes.

A further object of this invention is to disclose and provide a drilling fluid having a highly viscous thixotropic gel added thereto that is formed by combining an aqueous acid solution with an aqueous alkali metal silicate solution admixed to form a polymerized alkali metal silicate gel that is sheared during the mixing or followed by shearing of the gel to impart thixotropic properties thereto.

A still further object of this invention is the provision of an improved high temperature drilling fluid that is made by admixing a highly viscous thixotropic substance with a known water based drilling fluid. The new drilling fluid provides an improved method of drilling a borehole.

Another and still further object of this invention is the provision of an improved drilling fluid comprising a prior art water based drilling fluid having an aqueous alkali metal silicate solution admixed therewith. The aqueous alkali metal silicate solution is prepared by mixing about five parts by volume grade 40 sodium silicate solution with about 95 parts by volume water; to this solution is added an aqueous acid solution while agitating the mixture to lower the pH of the mixture to a value in the range of 7.5–8.5, whereby the alkali metal silicate polymerizes to form a highly viscous rigid gel which is sheared to impart thixotropic properties thereto.

These and various other objects and advantages of the invention will become readily apparent to those skilled in the art upon reading the following detailed description and claims and by referring to the accompanying drawings.

The above objects are attained in accordance with the present invention by the provision of an improved drilling fluid and method for use in a manner substantially as described herein.

BRIEF DESCRIPTION OF THE DRAWING

The FIGURE of the drawing sets forth a part schematical, part diagrammatical view of a drilling rig using a gel system in accordance with the present invention.

DETAILED DESCRIPTION OF THE PREFERRED EMBODIMENT

The FIGURE of the drawing discloses a drilling operation, generally indicated by the numeral 10, that includes a drilling rig 12 having an adjacent mud pit 14 therefor. Numeral 16 indicates a plurality of vessels or tanks capable of holding several hundred barrels of liquid.

A mud pump 18 is connected to a swivel 20 that supports a kelly 22 from a crown block of rig 12 in the usual manner. The rig rotary 24 drives an ordinary drill string 26. A casing 28 extends downhole and cases the upper end of the wellbore 29. Bit 30 is connected to the lower end of the drill string and is rotated by the drill string 26 which in turn is rotated by the rotary 24.

Annulus 32 returns drilling fluid at 34 into a flow line 36 that discharges into the mud pit 14. The mixing tanks at 16 are comprised of tanks or vessels 38, 40, 42, respectively, connected to flow lines 44, 46, 48, respectively, for conveying the chemical substance or mixture 50, 52, 54, respectively, and thereby changes or modifies the chemical composition of the drilling fluid 56 contained within mud pit 14. Formations 58 and 60 are located downhole and are penetrated by the wellbore.

The gel system of the present invention can be achieved in accordance with the preferred embodiment disclosed in the drawing by placing suitable vessels 38, 40, 42 in proximity of the mud pit 14 and connecting the vessels for flow therebetween in order to achieve the desired composition drilling fluid 56 in mud pit 14, as will be more fully described hereinafter.

EXAMPLE I

In the first example, it will be assumed that the drilling rig has already penetrated several thousand feet and that a heavy mud is required for drilling through a high pressure, high temperature formation 60, that is, a formation in excess of 220 degrees Fahrenheit and having a bottom hole pressure greater than the hydrostatic head of water. The upper aquifers have all been sealed off, no additional salt water formations are expected to be encountered, the mud pit 14 is empty, and the drilling rig is set up and ready to make additional hole.

Vessel 38 contains several hundred barrels of sodium silicate solution. Hydrochloric acid (20 Baume) is available at 64 and a suitable indicator, such as phenolphthalein, is available at 62. Sodium silicate 50 (50% to 10% of 40% active) is transferred through flow line 44 into the mixing tank 40. Weighting agents 54, such a barite, can be added to the drilling fluid 56 in mud pit 14 as needed to adjust the mud density and thereby control the bottom hole pressure. Other additives 70, 72, 74 such as surfactants, polymers and sodium silicate can be added to the fluid system as needed in order to change the characteristics of the drilling fluid 56.

A base fluid of fresh water from source 77 is placed within mixing tank 40. An indicator, such as phenolphthalein 62, or other measuring method, is used to monitor the pH of the mixture 52. An acidic chemical (relative to sodium silicate) is added to lower the pH of the mixture 52 to adjust the pH within the range of 8-9. This also brings about gelation or viscosifying of the fluid system.

As gelation within vessel 40 occurs, the fluid system must be continually agitated by employment of the mixer 68 thereby shearing the gelling substance to prevent mass gelation of the entire contents of the vessel 40. After initial gelation, various salts, such as calcium chloride and sodium chloride, can be added to the mixture 52 in order to inhibit swelling or migration of formation clays from fluid filtrate lost to the formation.

A quantity of the mixture 52 is transferred through flow line 46 into the mud pit 14 providing a concentration in the range of ½% to 7½% sodium silicate polymer, and preferably 2% to 4% sodium silicate polymer of the drilling fluid. Weighting agents 54, such as barite, for example, is transferred at 48 into the mud pit 14 to provide the improved drilling fluid 56.

The drilling rig commences making hole by rotating the drill string 26, causing the bit 30 to penetrate the earth and form the desired borehole, while at the same time mud pump 18 transfers the drilling fluid 56 through the swivel 20, down through the kelly 22, and to the bit 30 where the cuttings that result from making hole flow upward through the annulus 32 and back into the mud pit 14. Hence the composition of the drilling fluid 56 continually changes and therefore occasionally must be adjusted by addition of the various chemical substances 52, 54, and 70–74.

Additional sodium silicate can be added to the vessel 40 and transferred to the mud pit 14 as required to maintain the drilling fluid characteristics within a desired range of value. At the same time, weighting agents 54 and other known drilling fluid modifiers 70, 72, 74 can be added to the mixing tank or mud pit as desired.

Mixture 52 can be stored in vessel 40 without agitation for extended time periods up to when dehydration, sufficient to make the mixture immobile, occurs. This dehydration is dependent on ambient conditions.

The drilling fluid 56 is especially adapted for penetrating a high temperature zone or formation 60, such as associated with geothermal wells, for example. This is because the gel has stability up to 500 degrees F. In this disclosure, the term "geothermal well" is intended to mean a high temperature formation having a temperature greater than 220 degrees and less than 500 degrees F.

Another unexpected advantage of the drilling fluid 56 of this invention is that it is inexpensive and does not damage formation 60. In addition to its excellent high temperature stability, should it be lost to a fractured formation 80, it may easily be subsequently removed with appropriate acids, such as a mixture of hydrochloric and hydrofluoric acids.

Furthermore, the thixotropic character of the drilling fluid, when lost to weak zones, will help restore full circulation or returns. A substance exhibiting this desirable characteristic is sometime referred to as "lost circulation material".

EXAMPLE II

The drilling rig 12 has penetrated the earth to form a wellbore 29 of considerable depth and the geologist feels that a high temperature formation 60 is about to be encountered. The drilling fluid 56 previously used in drilling the borehole to the present depth comprises the borehole cuttings, well water and some salt water that accumulated while penetrating the upper strata.

The geologist anticipates that a ten pound drilling fluid will be adequate for penetrating high temperature formation 60 and the previously used drilling fluid is inadequate because of lack of thermal stability. Other known mud mixtures will not survive penetrating the high temperature formation 60 without deleterious effects such as thickening, thinning, or poor transport of the cuttings. Moreover, due to the bottom hole pressure, the geothermal formation 60 will probably fracture at formation 80, causing additional problems. The mud pit and borehole contain approximately 250 barrels of drilling fluid 56 and it is desired to add 60 barrels of the viscous thixotropic mixture 52, said viscous thixotropic mixture comprising a solution having about 10% polymerized alkali metal silicate therein, to the drilling fluid 56, thereby providing adequate protection against fluid thinning and break down of the drilling fluid caused by the geothermal properties of the formation 60. This sequence of events provide a method of drilling a borehole through a high temperature formation.

EXAMPLE III

A drilling fluid is obtained by preparing a 5% solution of sodium silicate in fresh water, to which an acidic material (relative to the sodium silicate) is added. The solution is mixed with high shear agitation to adjust the pH to approximately 8-9. With continued stirring, gelation occurs, forming a gelatinous, thixotropic base fluid for use in drilling a borehole.

Salt (NaCl, CaCl2, or other similar chemicals) is then added to the drilling fluid to protect against formation damage, hydration of shales and formation clays while drilling. As the depth is increased, barite, hematite, calcium carbonate, or other similar additives, may be added to the fluid in order to control unexpected formation pressures.

As drilling continues, additional prepared substance 52 may be added to the drilling fluid 56 to increase the volume of drilling fluid with depth, and to maintain the percent of substance 52 within the desired range of $\frac{1}{2}$% to 7$\frac{1}{2}$% sodium silicate polymer. Additionally, as the temperature increase to 300 degrees F. and above, an enriched drilling fluid, containing up to 7$\frac{1}{2}$% sodium silicate polymer, along with the addition of adequate salts and weighting agents, may be added in order to enhance the fluid for the harsher environments.

EXAMPLE IV

In the process of drilling a well, using the gel system of this invention, should an accidental drilling pressure increase occur that results in unintentional fracturing of the producing zone with high losses of drilling fluid to the productive formation, the rig continues to make hole and the well is drilled to its total depth, cased, cemented and perforated for production.

In other normal wells not having the advantages of this invention, the well would suffer lost production due to irremovable fracture damage to the production formation, induced from lost bentonite clay, organic polymers, barite, drilling emulsion, and other similar chemicals. Normal acid stimulation treatments would not satisfactorily remove this mud damage or drilling damage, whereas, it would do so with the present invention.

In a well that is drilled using the drilling fluid of this invention, the well is saved by using a HCl-HF acid treatment, squeezed into the fracture system, which would easily dissolve the gelling agent (polymerized sodium silicate), which on flow back removes the major suspension agent of the mud. With the suspending agent removed, the weighting agents and salts could be removed with subsequent squeezes or would drop to the bottom of the fracture system and thus, not significantly impair subsequent production.

After clean up, the producing zone could be stimulated using conventional acidizing or fracturing techniques. Conventional polymer muds, oil based muds and bentonite muds are near impossible to remove from a formation fracture after these unintentional lost circulation/fracturing incidents. Soaks using sodium hypochlorite, light aromatic solvents or HCl-HF acids respectively can remove some of the conventional fluid damage but are not routinely satisfactory. Hence, the present invention provides these unexpected advantages in addition to the above described unobvious and novel utility it provides as a high temperature drilling fluid.

In this disclosure, the range of $\frac{1}{2}$% to 7$\frac{1}{2}$% sodium silicate polymer is recited because $\frac{1}{2}$% sodium silicate polymer barely achieves the desired result at the moderate temperatures initially encountered as the geothermal formation is encountered, and 7$\frac{1}{2}$% sodium silicate polymer is believed to provide the maximum benefit with any excess having little advantage.

I claim:

1. An improved method of drilling a borehole with a drill string having a drill bit at the bottom thereof, wherein the borehole is to be extended through a high temperature formation, and a water based drilling fluid is circulated down the drill string to circulate cuttings to the surface; by carrying out the following steps:
    admixing a highly viscous thixotropic agent with said drilling fluid prior to encountering the high temperature formation;
    making said highly viscous thixotropic agent by combining an aqueous acid solution with an aqueous alkali metal silicate solution and a gelling agent to thereby obtain a highly viscous polymerized alkali metal silicate gel; and shearing the gel to impart thixotropic properties thereto;
    adjusting the quantity of polymerized alkali metal silicate gel that is present in said drilling fluid to a weight percent in the range of $\frac{1}{2}$% to 7$\frac{1}{2}$%; and,
    circulating the drilling fluid down the drill string to circulate cuttings to the surface.

2. The improved method of claim 1 and further including the steps of preparing the aqueous alkali metal silicate solution by mixing about five parts by volume water with the aqueous acid solution while agitating the resultant mixture to lower the pH of the mixture to a value in the range of 7.5 to 8.5 to cause the aqueous alkali metal silicate solution to polymerize into a highly viscous gel; and further including the addition of surfactants and polymers to the polymerized alkali metal silicate gel to modify the viscosity of said drilling fluid.

3. The method of claim 2 and further including the step of using the drilling fluid while penetrating a downhole formation that is easily fractured due to the magnitude of the bottom pressure;
    continuing to form the borehole through a fractured formation while circulating said drilling fluid into the borehole where the drilling fluid is forced to flow into the fractured formation and is deposited therewithin;

continuing to form the borehole to penetrate said high temperature formation;

completing the well and thereafter removing the gelling agent from the fractured formation by squeezing a mixture of hydrochloric and hydrofluoric acids into the fractured formation to dissolve the polymerized alkali metal silicate and flowing the alkali metal silicate back into the borehole along with some of the residue from the deposited drilling fluid.

4. The method of claim 1 wherein surfactants and polymers are added to the drilling fluid to modify the viscosity of the drilling fluid;

including adding additional gelled sodium silicate to the polymerized alkali metal silicate gel to increase the viscosity of the drilling fluid.

5. The method of claim 1 and further including the step of using the drilling fluid while penetrating a downhole formation that becomes fractured due to the magnitude of the bottom pressure;

continuing to form the borehole through the fractured formation while circulating said drilling fluid into the borehole where the drilling fluid is forced to flow into the fractured formation and is deposited therewithin;

continuing to form the borehole to penetrate said high temperature formation;

completing the well and thereafter removing the alkali metal silicate from the fractured formation by squeezing a mixture of hydrochloric and hydrofluoric acids into the fractured formation to dissolve the polymerized alkali metal silicate which flows back into the borehole along with some of the residue from the deposited drilling fluid.

6. In a drilling operation having a drill string for forming a borehole while drilling fluid flows down the drill string to a drill bit and back up a borehole annulus to a mud pit, the improved method of modifying the drilling fluid to enable the borehole to be extended through a geothermal formation and through a fractured formation comprising the steps of:

preparing a mixture of sodium silicate and water, and adjusting the pH thereof within a range of 8-9 and continually agitating and shearing the resultant mixture the amount required to avoid mass gelation of the mixture, thereby obtaining a highly viscous thixotropic fluid;

adjusting the specific gravity of the highly viscous thixotropic fluid by adding weighting agents to said mud pit;

admixing the resultant viscous thixotropic fluid with the drilling fluid to provide an improved drilling fluid having admixed therewith at least $\frac{1}{2}$-7$\frac{1}{2}$% activity by weight of said viscous thixotropic fluid;

whereby, there is provided an improved drilling fluid for use in high temperature formations.

7. The improved method of claim 6 and further including the step of using the drilling fluid downhole while penetrating a formation that becomes fractured due to the magnitude of the bottom pressure;

continuing to form the borehole through the fractured formation while circulating said drilling fluid into the borehole and therefore into the fractured formation whereupon the drilling fluid is forced to flow into the fractures of the formation and is deposited therewithin;

continuing to form the borehole to penetrate said geothermal formation;

completing the borehole and thereafter removing the thixotropic fluid from the formation by squeezing a mixture of hydrochloric and hydrofluoric acids into the fractured formation to dissolve the alkali metal silicate which flows back into the borehole along with some of the deposited drilling fluid.

wherein surfactants and polymers are added to the drilling fluid to modify the viscosity thereof.

8. The improved method of claim 7 wherein additional sodium silicate is added to the drilling fluid to increase the fluid viscosity thereof.

9. The improved method of claim 6 wherein surfactants and polymers are added to the drilling fluid to modify the viscosity of the viscous thixotropic fluid.

10. The improved method of claim 6 wherein the drilling fluid is added to said mud pit during a drilling operation and further including the step of using the drilling fluid downhole while penetrating a formation that becomes fractured due to the magnitude of the bottom hole pressure;

continuing to form the borehole through the fractured formation while circulating said drilling fluid from the mud pit, into the borehole, and therefore into the fractured formation whereupon the drilling fluid is forced to flow into the fractures and is deposited therewithin;

continuing to form the borehole to penetrate said geothermal formation;

completing the borehole and thereafter removing the alkali metal silicate by squeezing a mixture of hydrochloric and hydrofluoric acids into the fractured formation to dissolve the alkali metal silicate which flows back into the borehole along with some of the residue from the deposited drilling fluid.

* * * * *